US012679448B2

(12) United States Patent
Jung

(10) Patent No.: US 12,679,448 B2
(45) Date of Patent: Jul. 14, 2026

(54) STEERING CONTROL DEVICE AND METHOD

(71) Applicant: HL MANDO CORPORATION, Gyeonggi-do (KR)

(72) Inventor: Eulgo Jung, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 216 days.

(21) Appl. No.: 18/231,249

(22) Filed: Aug. 8, 2023

(65) Prior Publication Data

US 2024/0124051 A1     Apr. 18, 2024

(30) Foreign Application Priority Data

Oct. 18, 2022    (KR) ........................ 10-2022-0133724

(51) Int. Cl.
B62D 5/04 (2006.01)
B62D 15/02 (2006.01)

(52) U.S. Cl.
CPC ......... B62D 5/049 (2013.01); B62D 15/0225 (2013.01)

(58) Field of Classification Search
CPC .. B62D 5/049; B62D 15/0225; B62D 5/0484; B60W 40/02; B60W 50/14; B60W 2050/143; B60W 2050/146; B60W 2420/403; B60W 2555/20; B60W 2556/45; B60Y 2400/90
See application file for complete search history.

(56) References Cited

U.S. PATENT DOCUMENTS

| | | | | |
|---|---|---|---|---|
| 10,255,782 B1 * | 4/2019 | Ghannam | .............. | G08B 21/20 |
| 2003/0188915 A1 * | 10/2003 | Itakura | ................. | B62D 5/0463 |
| | | | | 180/443 |
| 2007/0194208 A1 * | 8/2007 | Stam | ........................ | G06T 7/42 |
| | | | | 348/E5.024 |
| 2018/0194390 A1 * | 7/2018 | Goto | ...................... | B62D 5/046 |
| 2019/0392656 A1 * | 12/2019 | Sarwar | .................. | G08B 21/20 |
| 2020/0088553 A1 * | 3/2020 | Kimoto | .............. | G01D 11/245 |

(Continued)

FOREIGN PATENT DOCUMENTS

| | | | | |
|---|---|---|---|---|
| DE | 102021212446 A1 * | 1/2022 | .............. | B62D 5/04 |
| JP | 2006-111032 | 4/2006 | | |

(Continued)

OTHER PUBLICATIONS

Office Action dated Sep. 15, 2025 for Korean Patent Application No. 10-2022-0133724 and its English translation provided by Applicant's foreign counsel.

*Primary Examiner* — Redhwan K Mawari
(74) *Attorney, Agent, or Firm* — WOMBLE BOND DICKINSON (US) LLP

(57) ABSTRACT
The present embodiments relate to a steering control device and method. A steering control device may include a communication device configured to receive a steering angle sensing signal from a steering angle sensor installed at a lower part of a rack-pinion gear, a detector configured to detect whether of an inflow of moisture into a steering device based on the steering angle sensing signal and generate moisture detection information if the inflow of moisture is detected, and a controller configured to perform a risk prevention control to prevent risk due to the inflow of moisture based on the moisture detection information.

20 Claims, 10 Drawing Sheets

<u>400</u>

(56) References Cited

U.S. PATENT DOCUMENTS

2022/0017141 A1 *  1/2022  Maruyama ........... B62D 15/025
2022/0363269 A1 *  11/2022  Saito ....................... B60R 21/00
2024/0003731 A1 *  1/2024  Heo ................... B62D 15/0225

FOREIGN PATENT DOCUMENTS

JP           2016009247  A  *  1/2016
JP           2018095059  A  *  6/2018
KR            100767185  B1 *  10/2007  ........... B60W 10/20
KR          20140014906  A  *  2/2014
KR          20180015236  A  *  2/2018  ........... B62D 5/0481
WO     WO-2018110216  A1 *  6/2018  ............... F16H 7/02

* cited by examiner

400

STEERING CONTROL DEVICE AND METHOD

CROSS REFERENCE TO RELATED APPLICATION

This application claims priority from Korean Patent Application No. 10-2022-0133724, filed on Oct. 18, 2022, which is hereby incorporated by reference for all purposes as if fully set forth herein.

TECHNICAL FIELD

An embodiment of the present disclosure relates to a steering control device and a steering control method. In particular, the present disclosure relates to a steering control device and a steering control method for detecting the inflow of moisture into a steering device and preventing a risk caused therefrom.

BACKGROUND

An electronic steering device refers to a device that performs optimal steering with respect to steering wheel operation by electrically controlling a steering motor or the like using an electronic control unit (ECU).

If moisture flows into some components of the electronic steering system, there may be difficult to transfer current normally to the component into which the moisture has flowed in, resulting in a failure. Thereafter, if moisture flows into the ECU part, a portion of the circuit board may be submerged, thereby increasing the risk of accidents due to malfunction of the ECU.

In particular, since the steering control unit and the driving unit are physically separated in the case of a steering device of a steer-by-wire (SBW) type, there may cause a steering failure even if moisture inflows into any one of the steering control unit and the driving unit. As a result, the risk of accidents due to moisture inflow may further increase.

Accordingly, it is required to develop a technology capable of immediately detecting the inflow of moisture from some components other than the ECU in the steering system and preventing the risk caused therefrom.

SUMMARY

Embodiments of the present disclosure is to provide a steering control device and steering control method capable of quickly detecting the inflow of moisture into a steering device.

In addition, embodiments of the present disclosure is to provide a steering control device and steering control method capable of detecting the inflow of moisture or water into a steering angle sensor.

In addition, embodiments of the present disclosure is to provide a steering control device and steering control method capable of preventing a failure of a power pack due to moisture inflow into the steering device.

In accordance with an aspect of the present disclosure, there is provided a steering control device including a communication device configured to receive a steering angle sensing signal from a steering angle sensor installed at a lower part of a rack-pinion gear, a detector configured to detect whether of an inflow of moisture into a steering device based on the steering angle sensing signal and generate moisture detection information if the inflow of moisture is detected, and a controller configured to perform a risk prevention control to prevent risk due to the inflow of moisture based on the moisture detection information.

In accordance with another aspect of the present disclosure, there is provided a steering control method including receiving a steering angle sensing signal from a steering angle sensor installed at a lower part of a rack-pinion gear, detecting whether of an inflow of moisture into a steering device based on the steering angle sensing signal, and generating moisture detection information if the inflow of moisture is detected, and performing a risk prevention control to prevent risk due to the inflow of moisture based on the moisture detection information.

According to an embodiment of the present disclosure, it is possible to provide a steering control device and control method for quickly detecting the inflow of moisture into the steering device.

In addition, according to an embodiment of the present disclosure, it is possible to provide a steering control device and control method for detecting the inflow of moisture into a steering angle sensor.

In addition, according to an embodiment of the present disclosure, it is possible to provide a steering control device and control method for preventing power pack failure due to the inflow of moisture into steering device

DETAILED DESCRIPTION

Figure 1:
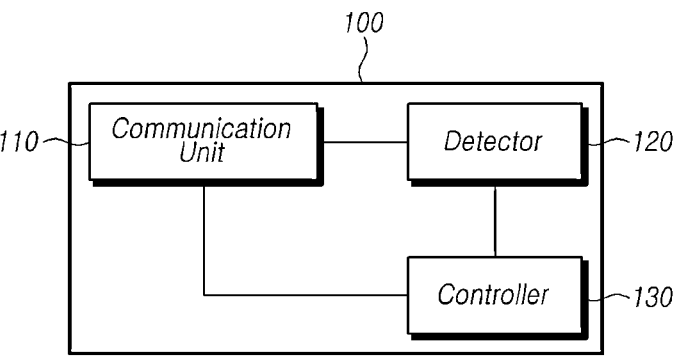
FIG. 1 illustrates a block diagram of a steering control device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 illustrates a block diagram of a steering control device according to an embodiment of the present disclosure.

Referring to FIG. 1, a steering control device 100 according to the present disclosure may include a communication unit 110, a detector 120, and a controller 130. In addition, the communication unit 110, the detector 120, and the controller 130 may be connected to each other. In this specification, a communication unit may have the same meaning as a communication device.

For example, the steering control device 100 may include the communication unit 110 for receiving a steering angle sensing signal from a steering angle sensor installed at a lower part in the ground direction inside a rack device, and the detector 120 for detecting whether of an inflow of moisture into a steering device based on the steering angle sensing signal and generating moisture detection information in case of the inflow of moisture, and the controller 130 for performing risk prevention control to prevent the risk due to the inflow of moisture based on the moisture detection information.

The communication unit 110 may be connected to each component in the steering device or other devices in a vehicle, and may transmit/receive information with each component in the steering device or other devices in the vehicle. The communication unit 110 may transmit/receive signals and information at any time or at specific period.

For example, the communication unit 110 may receive signals and information including a steering angle sensing signal, a moisture monitoring signal, surrounding image information, and weather information, and may transmit moisture detection information generated by the detector 120 to other control devices in the vehicle.

For example, the communication unit 110 may receive a steering angle sensing signal from a steering angle sensor. In this case, the steering angle sensing signal may include a success signal generated if the steering angle sensor senses normally and a fail signal generated if the steering angle sensor senses abnormally.

For example, the communication unit 110 may further receive surrounding image information obtained by capturing the surroundings of the vehicle from a camera sensor. In this case, the surrounding image information may include a front road image or a rear road image obtained by capturing a road in front or rear of the vehicle, and, may further include, in some cases, a side image of the vehicle and other images related to the surrounding environment of the vehicle.

For example, the communication unit 110 may further receive weather information about the surroundings of the vehicle from the autonomous cooperative driving communication device or a V2X communication device. In this case, the autonomous cooperative driving communication device or the V2X communication device may include a vehicle-to-vehicle (V2V) communication device installed in a host vehicle, a vehicle-to-vehicle (V2V) communication device installed in another vehicle, and a vehicle-to-infrastructure (V2I) communication device installed on the ground or in a building.

For example, the communication unit 110 may further receive a moisture monitoring signal from a moisture inflow determination circuit installed in the steering angle sensor. The moisture inflow determination circuit may be implemented in a PCB of the steering angle sensor, or may be implemented in a separate independent PCB and attached to the steering angle sensor.

For example, the moisture inflow determination circuit may include a configuration for detecting moisture present around the steering angle sensor through a leak sensor. Here, the leak sensor may include any configuration related to a leak sensor such as a film-type leak sensor, a band-type leak sensor, and a cable-type leak sensor.

For example, the moisture inflow determination circuit may determine whether of the inflow of moisture by determining whether a magnitude of a voltage measured at a preset point exceeds a preset threshold range, and generate a moisture monitoring signal according to the determination result.

Here, the threshold range may be set in advance as a limit value range of the voltage capable of determining the inflow of moisture based on the respective voltage ranges when moisture is not introduced and when moisture is introduced to a preset point in the moisture inflow determination circuit.

In addition, the steering control device 100 may utilize the surrounding image information, weather information, and moisture monitoring signal to detect whether of the inflow of moisture into the vehicle. It will be described the detection of inflow of moisture using surrounding image information, weather information, and a moisture monitoring signal in more detail in the description of the detector 120 below.

The detector 120 may be connected to at least one of the communication unit 110 and the controller 130. In this case, the detector 120 may perform a preset determination process based on the signal or information received from the communication unit 110, or may extract or generate a new signal or information. Alternatively, in some cases, the detector 120 may perform determination, extraction, and generation using other signals, other information, or preset values together. In addition, the detector 120 may provide extracted or generated information to the controller 130.

For example, if the steering angle sensing signal received from the steering angle sensor is a fail signal, the detector 120 may determine that moisture has flowed into a steering device. In this case, the steering angle sensor may be installed on the lower part of a rack device of the vehicle in the direction of the ground. In this way, the detector 120 may more quickly detect the inflow of moisture into the steering device through the determination of the inflow of moisture into the steering angle sensor installed at the lower part. The installation position of the steering angle sensor will be described in more detail with reference to FIGS. 5 and 6 below.

In some cases, the detector 120 may generate information about a reception time for each signal or information received by the communication unit 110. In addition, if the fail signal is received, the detector 120 may also generate information about the number of times of consecutive receptions of the fail signal.

For example, the detector 120 may determine that moisture has flowed into the steering device if the fail signal is received for more than a predetermined threshold period. In this case, the detector 120 may generate reception time information for each fail signal together, and determine whether the fail signal is received for more than a predetermined threshold period based on each fail signal and reception time information.

That is, in the case that the fail signal received from the steering angle sensor is received only for a short time period less than the threshold period, the detector 120 may determine that the introduced moisture may be immediately discharged or evaporated, so that may determine that no moisture has entered.

On the other hand, if the fail signal is received during a period longer than the threshold period, the detector 120 may determine that the steering angle sensor is not simply malfunctioning, but a detection failure due to the inflow of moisture.

For example, the detector 120 may determine that moisture is introduced into the steering device if the fail signal is continuously or consecutively received more than a predetermined threshold number of times. In this case, when the fail signal is received, the detector 120 may generate information on the number of times of consecutive receptions of the fail signal together, and determine whether the number of times of consecutive receptions of the fail signal is greater than or equal to a threshold number of times based on each fail signal and information on the number of times of consecutive receptions.

That is, if the number of times of consecutive receptions of the fail signal received from the steering angle sensor is less than the threshold number of times, the detector 120 may determine that the introduced moisture may be immediately discharged or evaporated, so that may determine that no moisture has entered.

Meanwhile, if the number of times of consecutive receptions of the fail signal is equal to or greater than the threshold number of times, the detector 120 may determine that the steering angle sensor is not simply malfunctioning, but a detection failure due to the inflow of moisture.

In addition, if at least one of a condition regarding whether to receive a fail signal, a condition in which the fail signal is received for a threshold time period or more, and a condition in which the fail signal is continuously or consecutively received for more than a threshold number of times is satisfied, the detector 120 may determine as the inflow of moisture. In some cases, the detector 120 may determine as the inflow of moisture if all of the corresponding conditions are satisfied.

In addition, the moisture detection conditions for the steering device may include only detection conditions related to the fail signal as described above, or may further include conditions related to surrounding image information and monitoring signals to be described below. The detector 120 may determine the inflow of moisture by combining these various conditions, thereby improving performance and accuracy of detecting moisture inflow into the steering device.

For example, the detector 120 may determine whether a weather around the vehicle is rainy situation based on the surrounding image information. In this case, the detector 120 may determine that moisture has flowed into the steering device if a condition determined to be the rainy situation based on the surrounding image information and a condition that the steering angle sensing signal is a fail signal are simultaneously satisfied.

For example, the detector 120 may detect whether or not there are raindrops in the front view, changes in shape and color of the road, presence or absence of water puddles, etc. through a front image or a rear image of the vehicle included in the surrounding image information. Through this, it is possible to determine whether the environment around the vehicle allows moisture to flow into the vehicle.

If it is determined that the surrounding environment of the vehicle is a rainy situation or an environment with a high possibility of moisture inflow through this surrounding image information, and the moisture detection condition related to the fail signal received from the steering angle sensor is satisfied, the detector 120 may determine that moisture has flowed into the steering device.

For example, the detector 120 may determine that moisture is flowed into the steering device if the moisture monitoring signal received from the moisture inflow determination circuit exceeds a preset threshold range.

For example, if both the moisture detection condition for the fail signal received from the steering angle sensor and the condition in which the moisture monitoring signal exceeds a threshold range are simultaneously satisfied, the detector 120 may determine as the inflow of moisture into the steering device.

Alternatively, if only one of the moisture detection condition for the fail signal received from the steering angle sensor and the condition in which the moisture monitoring signal exceeds a threshold range is satisfied, the detector 120 may determine as the inflow of moisture into the steering device.

The controller 130 may control each component in the steering device to perform a specific operation, and may control to transmit specific information to other components other than the steering device.

For example, the controller 130 may perform risk prevention control to prevent a risk due to moisture inflow into the steering device. In addition, such risk prevention control may be set to be performed in the case that it is determined that moisture has flowed into the steering device and the moisture detection information generated by the detector 120 is received.

For example, the risk prevention control may include at least one of a safety steering control, a sensing information transmission control, and a warning notification control.

For example, the controller 130 may perform the safe steering control for controlling so that a steering torque generated by a steering motor is maintained below a preset risk prevention torque.

In this case, the safe steering control may include controlling the steering device within a safe operating range in order to prevent steering angle sensing error, steering command error, malfunction of the steering driving device, which may be occurred due to moisture inflow, and the resulting risk of safety accident.

For example, the safe steering control may include controlling steering torque to be less than risk prevention torque even when a driver applies a high torque to a steering wheel, unlike a general driving state of the vehicle.

In this case, the steering motor may include both a steering assist motor or a steering reaction force motor for assisting the driver's steering wheel manipulation and a steering driving motor for steering the vehicle. In this case, the steering torque may include both a steering assist torque or steering reaction force torque generated from the steering assist motor or steering reaction force motor, and steering driving torque generated from the steering driving motor.

For example, the safe steering control may be performed together under a separate operation mode set so that the vehicle can drive in a safe state with not only the steering device but also the entire vehicle.

For example, the safe steering control may be performed if the vehicle is in a Limp Home mode or a Limp Aside mode. In this Limp Home mode or the Limp Aside mode, in the event of a failure in some components of the vehicle, the control value of each component of the vehicle may be reset to a preset value, so that the vehicle can be returned home, stored in a repair shop, or stopped on the shoulder in a state in which the spread of the failure is prevented by controlling in-vehicle devices including a steering device, a transmission device and a braking device.

For example, the controller 130 may perform detection information transmission control for controlling moisture detection information to be transmitted to other control devices in the vehicle. If moisture flows into the steering device, the controller 130 may not only safely control each component of the steering device and operations related to steering of the vehicle, but also allow other devices in the vehicle to perform an operation to prevent the risk due to moisture inflow.

For example, the controller 130 may transmit moisture detection information to control devices such as a transmission device and a braking device in the vehicle through control of transmission of the sensing information. By using the transmission of the moisture detection information, the vehicle may travel below a predetermined vehicle speed or prevent rapid acceleration or braking beyond a preset range, thereby comprehensively preventing the risk due to moisture inflow.

As an example, the controller 130 may perform warning notification control including at least one of outputting a diagnostic trouble code (DTC) message, outputting a navigation message, outputting a warning sound, and displaying a warning lamp.

For example, the warning notification control through a DTC message may include controlling a DTC message corresponding to a failure due to the moisture inflow to a steering device to be displayed through an on-board diagnostic (OBD) system of the vehicle.

In some cases, the controller 130 may further include a detection information transmission control function in which the OBD system transmits moisture detection information in order to perform warning notification control through a DTC message.

For example, the warning notification control through a navigation message may include controlling a navigation message corresponding to a failure due to the moisture inflow to a steering device to be displayed through a navigation device installed in a vehicle.

For example, the warning notification control through the warning sound output and the warning lamp display may include controlling a warning message to be output or displayed through an audio output device, a beep sound output device, or a warning lamp display device installed in a vehicle.

Figure 2:
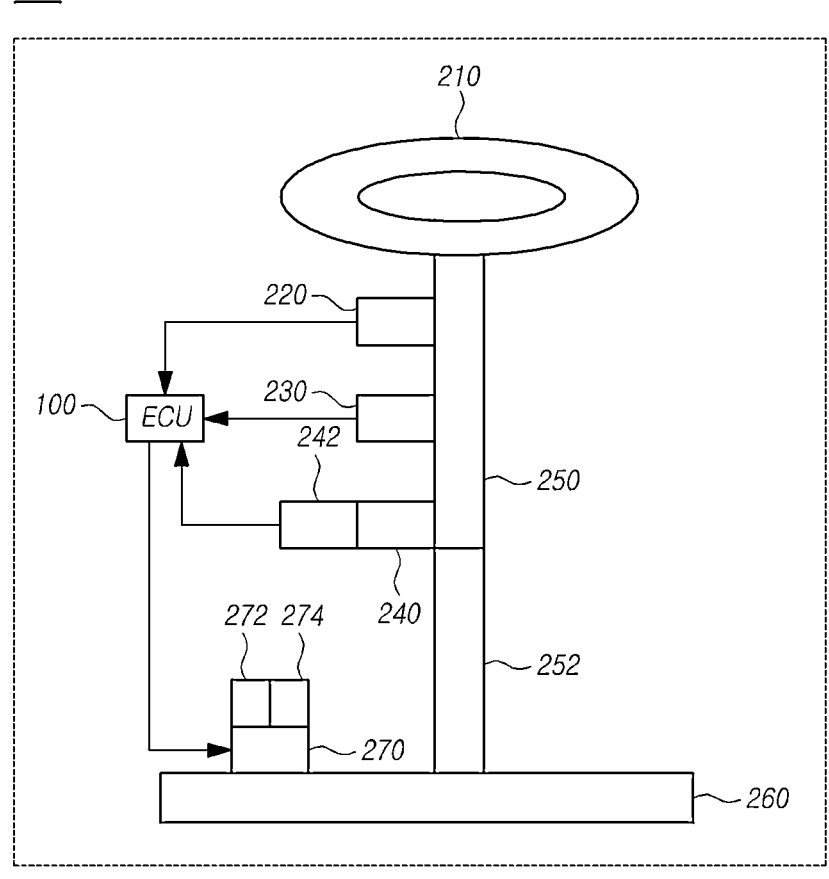
FIG. 2 is a diagram illustrating an example of a configuration of a steering device according to an embodiment.

FIG. 2 is a diagram illustrating an example of a configuration of a steering device according to an embodiment.

Referring to FIG. 2, a first steering device 200 according to an embodiment may include a configuration for performing steering using an electric power steering (EPS) method.

For example, the first steering device 200 includes at least one of a steering control device 100, a steering wheel 210, a steering angle sensor 220, a steering torque sensor 230, a steering motor 240, a steering motor position sensor 242, a steering column 250, a steering shaft 252, a rack device 260, a driving motor 270, a driving torque sensor 272 and a driving motor position sensor 274.

Here, the steering control device 100 may include one or more ECUs, and may include two or more ECUs in some cases.

As an example, the first steering device 200 may detect the movement of the steering wheel 210 using the steering angle sensor 220 to generate steering angle information, and may generate steering torque information by detecting torsional displacement of the steering column 250 generated by the movement of the steering wheel 210 using the steering torque sensor 230. The first steering device 200 may include the steering shaft 252 or the like physically connecting an upper part including the steering wheel 210 and the steering column 250 and a lower part including the rack device 260.

For example, the first steering device 200 may generate steering assist torque based on at least one of steering angle information and steering torque information using the steering motor 240, and may detect a position of the steering motor 240 using the steering motor position sensor 242 to generate steering motor position information.

For example, the first steering device 200 may transfer the steering force generated based on the movement of the steering wheel 210 to the rack device 260 through the steering column 250 and the steering shaft 252. In addition, the rack device 260 may be moved in both directions in a straight line by the steering force transferred to the rack device 260 and the driving force generated by the driving motor 270, and may steer the wheels based on the movement of the rack device 260.

In some cases, the first steering device 200 includes a driving torque sensor 272 for detecting torque generated by the driving motor 270 and a driving motor position sensor 274 for detecting the position of the driving motor 270. In this case, the steering control device 100 may generate driving torque information using a detection signal of the driving torque sensor 272 and driving motor position information using a detection signal of the driving motor position sensor 274.

Figure 3:
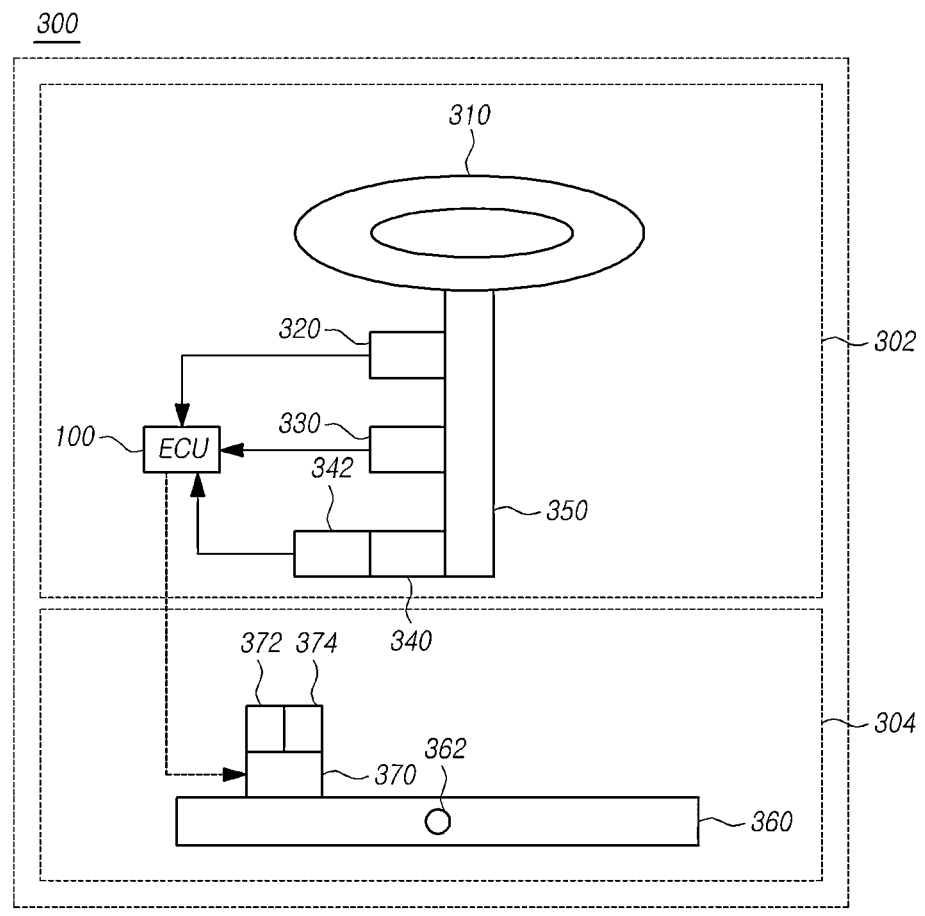
FIG. 3 illustrates an example of a configuration of a steering device according to another embodiment.

FIG. 3 illustrates an example of a configuration of a steering device according to another embodiment.

Referring to FIG. 3, a second steering device 300 according to another embodiment may include a configuration for performing steering in a steer-by-wire (SBW) method. In this case, the second steering device 200 may include a steering reaction force device 302 and a steering driving device 304, respectively. The steering reaction force device 302 may be expressed as a steering feedback actuator (SFA), and the steering driving device 304 may be expressed as a road wheel actuator (RWA).

For example, the steering control device 100 according to the present disclosure may be applied to steering control for driving the second steering device 300.

The steering reaction force device 302 may detect the driver's intension or the movement of a steering wheel 310 to calculate information about a target rack position in the steering driving device 304, and may detect a steering torque from a steering angle sensor 320 or a steering torque sensor 330 ad generate steering reaction force torque to deliver an appropriate steering feeling to the driver through a steering motor 340. This may be expressed as steering feedback control.

In addition, the steering driving device 304 may receive information about the target rack position from the steering reaction force device 302 and perform a tracking function based on this. In this case, the steering control device 100 according to the present disclosure may perform steering feedback control including controlling a rack device 360 to move in pursuit of the target rack position.

As described above, in the case that steering control is performed in the second steering device 300 using the steering control method according to the present disclosure, even though the steering reaction force device 302 and the steering driving device 304 are not physically connected, the driver may perform steering of the vehicle with the same feeling as if they are actually connected through the above steering feedback control.

Meanwhile, the steering control device 100 may include one or more ECUs as in FIG. 2, and may include two or more ECUs in some cases.

For example, the second steering device 300 may include at least one of a steering control device 100, a steering wheel 310, a steering angle sensor 320, a steering torque sensor 330, a steering motor 340, a steering motor position sensor 342, a steering column 350, a rack device 360, a driving motor 370, a driving torque sensor 272, and a driving motor position sensor 274.

The steering reaction force device 302 may generate a steering reaction force by feedback on the force applied to the steering wheel 310. In this case, the steering reaction force device 302 may include at least one of the steering wheel 310, the steering angle sensor 320, the steering torque sensor 330, the steering motor 340, and the steering column 350.

Here, the steering reaction force may refer to a force generated to deliver an appropriate steering feeling to the driver in response to the movement of the steering wheel 310. In general, the steering reaction force may include the meaning of a counterforce, but does not necessarily mean a force in the opposite direction to the force applied to the steering wheel 310. In some cases, the steering reaction force may be a force in the same direction as the force applied to the steering wheel 310, and an appropriate steering feeling may be delivered to the driver using this steering reaction force.

The steering driving device 304 may generate a driving force for the wheels of the vehicle. In this case, the steering driving device 304 may include at least one of the rack device 360 and the driving motor 370.

Compared to the first steering device 200, the second steering device 300 has a difference in that the steering reaction force device 302 and the steering driving device 304 are not physically connected. Depending on the difference, the operation process, function and effect of each component may be different.

For example, the steering motor 240 in the first steering device 200 may generate steering assist torque to assist in making the steering operation easier in response to the driver's steering wheel movement. Meanwhile, the steering motor 340 in the second steering device 300 may be different in that it is configured to generate reaction force torque to provide an appropriate steering feeling to the driver.

For example, the rack device 260 of the first steering device 200 may be moved using both the steering force transmitted from the steering wheel 210 and the driving force generated from the driving motor 270. Meanwhile, the rack device 360 of the second steering device 300 is different in that the rack device 360 cannot receive steering force from the steering wheel 310 and may steer only using the driving force generated from the driving motor 340.

For example, in the first steering device 200, since the steering wheel 210, the steering column 250, the steering shaft 252, and the rack device 260 are physically connected, the movement of the steering wheel may be physically transmitted to the rack device 260, and movement of the rack device may be physically transmitted to the steering wheel 210.

In this case, the steering motor 240 may generate a steering assist torque to assist in making the steering operation easier, in addition to the torque generated according to the steering wheel movement.

In addition, the driving motor 270 may generate rack assist torque for assisting rack thrust generated by transmitting steering torque according to steering wheel movement to the rack device 260.

Meanwhile, in the second steering device 300 without including the steering shaft 252 in the first steering device 200, since the steering wheel 310 and the steering column 350 are not physically connected to the rack device 360, the steering wheel movement cannot be physically transmitted to the rack device 360, and the rack movement cannot be physically transmitted to the steering wheel 310.

In this case, the steering motor 340 may generate reaction force torque to deliver an appropriate steering feeling corresponding to the steering wheel movement to the driver.

In addition, the driving motor 370 may generate a rack driving torque for moving the rack in a magnitude corresponding to the steering wheel movement. Here, the steering control device 100 may control the rack driving torque to be generated with a magnitude calculated through transmission and reception of electronic signals and signal processing.

However, except for the structural differences as described above, the first steering device 200 and the second steering device 300 have the same functions and corresponding configurations in vehicle steering.

Accordingly, the steering control device 100 according to the present disclosure may be applied to both the first steering device 200 and the second steering device 300, respectively. However, hereinafter, it will be described an embodiment in which the steering control device 100 according to the present disclosure is applied to the second steering device 300.

Figure 4:
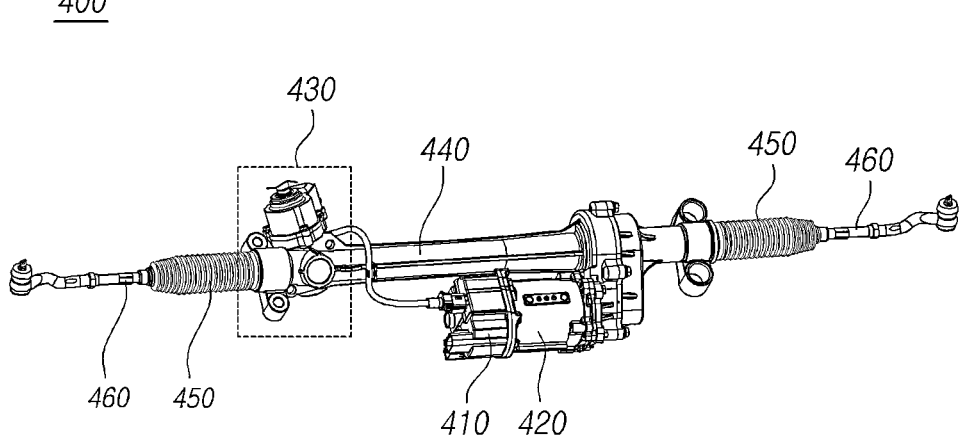
FIG. 4 is a diagram for illustratively describing a steering driving device according to an embodiment.

FIG. 4 is a diagram for illustratively describing a steering driving device according to an embodiment.

Referring to FIG. 4, a steering driving device 400 may include an ECU 410, a motor 420, a cover assembly 430, a rack device 440, a bellows 450, and a tie rod 460.

For example, the steering driving device 400 may control each component in the device through the ECU 410, and may control the steering driving of the vehicle.

For example, the ECU 410 may control the motor 420 to generate a specific motor driving torque, and the motor driving torque may be transmitted to the wheels via the rack device 440 and the tie rod 460 so as to control the steering operation of the vehicle.

In this case, if moisture flows into the steering driving device 400, there may be occurred a failure and errors in steering operation, and there may occur risks such as vehicle safety accidents due to such failures and errors.

For example, the bellows 450 in the steering driving device 400 may be damaged due to abrasion due to long-term use or rapid operation or the like.

In addition, if the vehicle is driven in a rainy situation or a situation similar thereto with damage or the like, moisture may flow into a worn or damaged part such as the bellows 450. The introduced moisture may expand while moving to the inside of the cover assembly 430, the rack device 440, the ECU 410, and the motor 420.

Regarding the risk of the vehicle safety due to the inflow of moisture, as described in FIGS. 2 and 3, the electrical steering device may be relatively more vulnerable to such risk.

For example, if moisture flows into the rack device 440, the bellows 450, and the tie rod 460, there may end up as a failure of the component into which the moisture flows. On the other hand, if moisture flows into the ECU 410 and the motor 420, a problem occurs in the steering control command and the generation of driving torque, so the entire steering system may become in a fault state.

In particular, in a steering device, the ECU 410 and the motor 420 may be coupled to each other and mounted in the form of a power pack, so that there is more need to prevent failure of the steering system due to the inflow of moisture.

Figure 5:
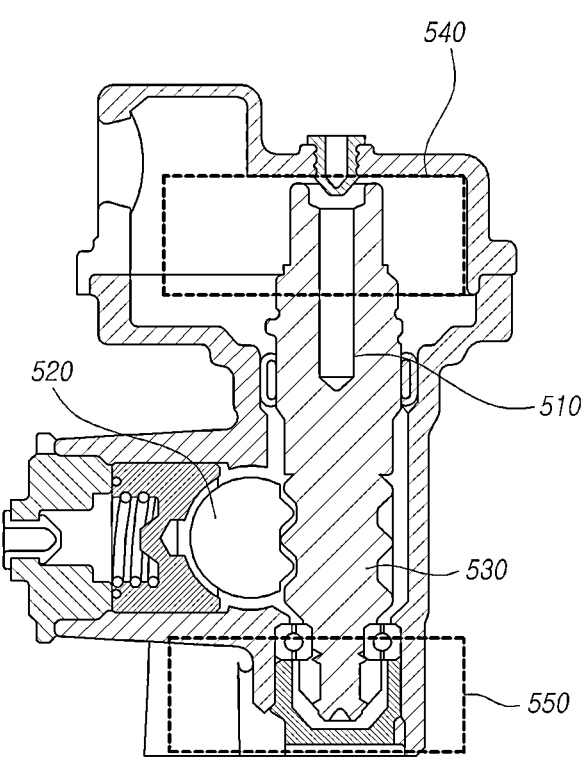
FIGS. 5 and 6 are diagrams for illustratively explaining configurations of a cover assembly and a steering angle sensor according to an embodiment.
Figure 6:
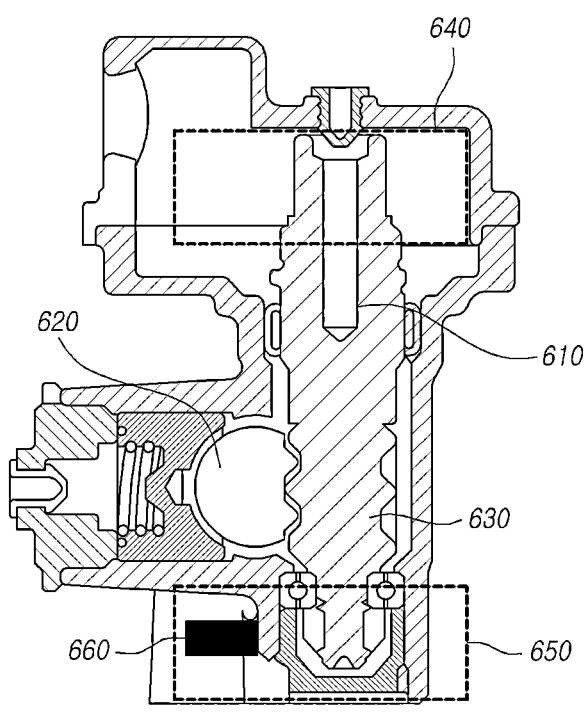

If moisture flows in through the bellows 450, there is required to quickly detect whether moisture flows into the cover assembly 430, and prevent additional moisture inflow and diffusion to the ECU 410 and the motor 420. In FIGS. 5 and 6, the moisture inflow structure will be described in relation to the configuration of the cover assembly 430 and the position of the steering angle sensor.

FIGS. 5 and 6 are diagrams for illustratively explaining configurations of a cover assembly and a steering angle sensor according to an embodiment.

FIG. 5 is a diagram for illustratively explaining an installable position of a steering angle sensor according to an embodiment.

Referring to FIG. 5, the cover assembly 430 may include a pinion shaft 510, a rack bar 520, and a pinion gear 530. In addition, an upper part 540 of the rack-pinion gear and a lower part 550 of the rack-pinion gear may be disposed within the cover assembly 430.

For example, the cover assembly 430 may include the pinion shaft 510 and the pinion gear 530 for conversion between rotational motion and linear motion therein. In this case, the pinion shaft 510 and the pinion gear 530 may be individually configured but connected to each other. Alternatively, the pinion shaft 510 and the pinion gear 530 may be integrated into one configuration with an upper pinion shaft 510 as an upper part and the pinion gear 530 in a lower rack-pinion coupling part. In addition, the rack bar 520 may change the steering angle of the wheel by converting the rotational motion of the driving motor into linear motion through the rack-pinion coupling with the pinion gear 530.

Meanwhile, in the cover assembly 430, sensors related to steering driving including a steering angle sensor may be mounted on at least one of the upper part 540 of the rack-pinion gear and the lower part 550 of the rack-pinion gear.

Here, the criterion for dividing the upper and lower of the rack-pinion gear may be based on the position and direction of mounting the steering driving device 400 on the vehicle. For example, a side farther from the ground may be the upper part 540 of the rack-pinion gear, and a side closer to the ground may be the lower part 550 of the rack-pinion gear.

For example, if a steering angle sensor or the like is installed or mounted on the upper part 540 of the rack-pinion gear and the lower part 550 of the rack-pinion gear, a path of moisture inflow may vary depending on the mounting position. In addition, the path of moisture inflow may be determined considering that water is generally filled while flowing in from a downward direction.

For example, if moisture flows in from the bellows 450, the path of moisture inflow may be formed in the order of the lower part 550 of the rack-pinion gear, the pinion gear 530 and the rack bar 520, the pinion shaft 510, the upper part 540 of rack-pinion gear, and the steering angle sensor.

As another example, in the case that the steering angle sensor is mounted on the lower part 550 of the rack-pinion gear and the moisture flows in from the bellows 450, the path of moisture inflow may be formed in the order of the lower part 550 of the rack-pinion gear, the steering angle sensor, and the pinion gear 530 and the rack bar 520, the pinion shaft 510, and the upper part 540 of the rack-pinion gear.

FIG. 6 6 is a diagram for explaining an embodiment in which a steering angle sensor is installed at a lower part of a steering driving device according to an embodiment.

Referring to FIG. 6, the cover assembly 430 may include a pinion shaft 610, a rack bar 620, a pinion gear 630, an upper part 640 of rack-pinion gear 640, a lower part 650 of rack-pinion gear, and a steering angle sensor 660. In this case, the steering angle sensor 660 may be mounted on the lower part 650 of the rack-pinion gear.

As shown in FIG. 6, if the steering angle sensor 660 is installed on the lower part 650 of the rack-pinion gear, considering the path of moisture inflow, it is possible to detect the inflow of moisture relatively more quickly than the configuration in which the steering angle sensor 660 is installed on the upper part 640 of the rack-pinion gear.

In summary, the present disclosure may include a configuration in which the steering angle sensor is mounted at the lowest position based on vehicle installation in a steering system including a pure play steer-by-wire system, and the inflow of moisture is detected through the fail signal of the steering angle sensor.

Accordingly, it is possible to prevent failure of other electrical or electronics systems of the road wheel actuator (RWA) system, and to implement an improved RWA design in terms of safety.

That is, the present embodiment may provide a configuration further including a moisture detection function using a detection signal of a steering angle sensor mounted at the lowest position, so that it is possible to secure robustness against common cause failures including failures caused by the inflow of moisture.

Hereinafter, it will be described a steering control method using the steering control device 100 capable of performing all of the above-mentioned functions in the present disclosure. The configuration overlapping with the above-described contents may be omitted in some cases, but may be also applied for the method below.

Figure 7:
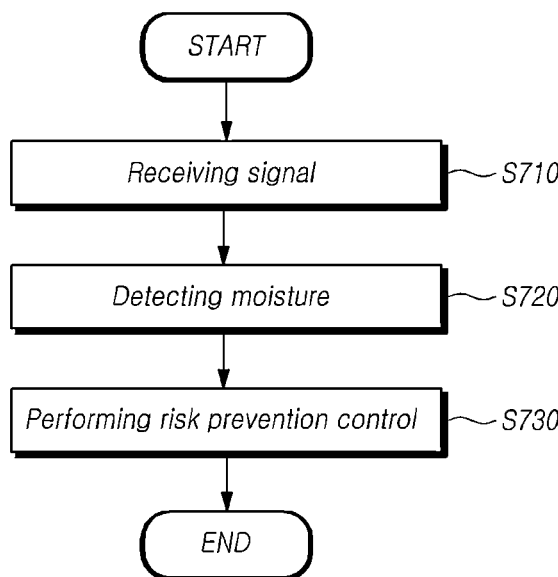
FIG. 7 is a flowchart of a steering control method according to an embodiment.

FIG. 7 is a flowchart of a steering control method according to an embodiment.

Referring to FIG. 7, the steering control method according to an embodiment may include a signal reception step (S710), a moisture detection step (S720), and a risk prevention control step (S730).

Specifically, the steering control method may include receiving a steering angle sensing signal from a steering angle sensor installed at a lower part of the vehicle's rack device in the ground direction (S710), detecting whether of an inflow of moisture into a steering device based on the steering angle sensing signal, and generating moisture detection information if the inflow of moisture is detected (S720), and performing a risk prevention control to prevent risk due to the inflow of moisture based on the moisture detection information (S730).

For example, the signal reception step (S710) may including receiving each signal and information including steering angle sensing signal, moisture monitoring signal, surrounding image information and weather information.

For example, the signal reception step (S710) may including receiving a steering angle sensing signal from a steering angle sensor installed at a lower part of the rack-pinion gear. In this case, the steering angle sensing signal may include a success signal generated if the steering angle sensor senses normally and a fail signal generated if the steering angle sensor senses abnormally.

For example, the signal reception step (S710) may further include receiving surrounding image information obtained by capturing the surroundings of the vehicle from a camera sensor. In this case, the surrounding image information may include a front road image or a rear road image obtained by capturing a road in front or rear of the vehicle, and, may further include, in some cases, a side image of the vehicle and other images related to the surrounding environment of the vehicle.

For example, the signal reception step (S710) may further include receiving weather information about the surroundings of the vehicle from the autonomous cooperative driving communication device or a V2X communication device. In this case, the autonomous cooperative driving communication device or the V2X communication device may include a vehicle-to-vehicle (V2V) communication device installed in a host vehicle, a vehicle-to-vehicle (V2V) communication device installed in another vehicle, and a vehicle-to-infrastructure (V2I) communication device installed on the ground or in a building.

For example, the signal reception step (S710) may further include receiving a moisture monitoring signal from a moisture inflow determination circuit installed in the steering angle sensor. In this case, the moisture inflow determination circuit may determine whether of the inflow of moisture by determining whether a magnitude of a voltage measured at a preset point exceeds a preset threshold range, and generate a moisture monitoring signal according to the determination result.

The moisture detection step (S720) may include determining whether of the inflow of moisture based on moisture detection conditions including a condition regarding whether to receive a fail signal, a condition regarding the reception period of the fail signal and a condition regarding the number of times of consecutive receptions of the fail signals.

In addition, in the moisture detection step (S720), a moisture detection condition may be set by further at least one of the surrounding image information received from the camera sensor, the weather information received from the autonomous cooperative driving (V2X) communication device, and the moisture monitoring signal received from the moisture inflow determination circuit. Accordingly, there may be determined whether of the inflow of moisture based on the moisture detection condition.

The risk prevention control step (S730) may include performing a risk prevention control to prevent risk due to the moisture inflow into the steering device.

Figure 9:
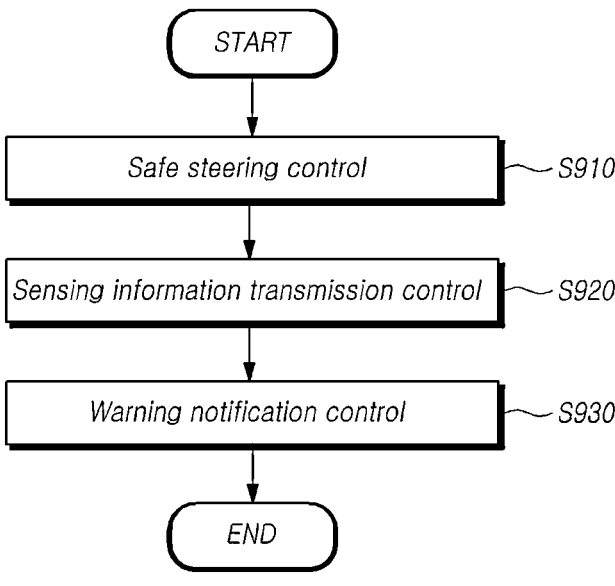
FIG. 9 is a flowchart illustrating the risk prevention controls according to an embodiment.

In this case, the risk prevention control step (S730) may include, as shown in FIG. 9 below, at least one of a safe steering control step (S910), a detection information transmission step (S920), a warning notification control step (S930), and the like.

Figure 8:
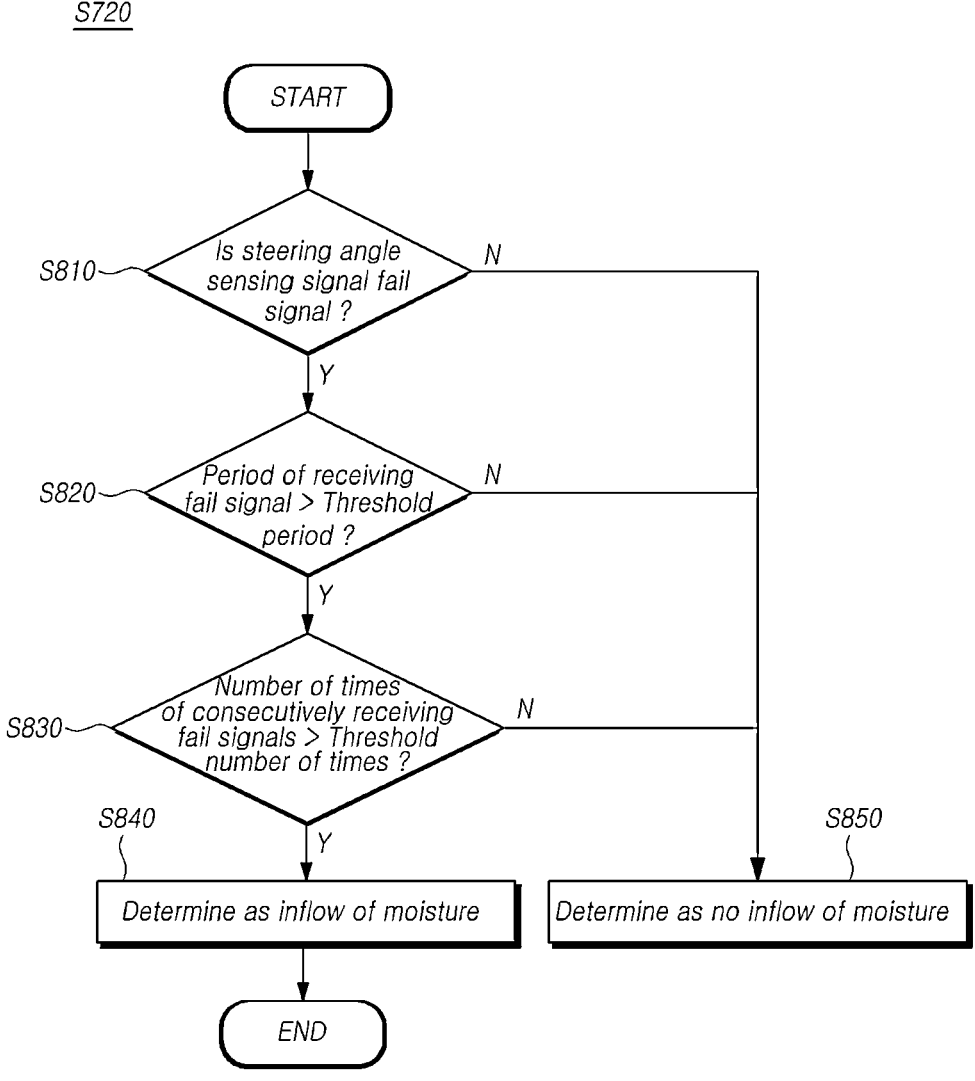
FIG. 8 is a flowchart for illustratively describing a moisture detecting step according to an embodiment.

FIG. 8 is a flowchart for illustratively describing a moisture detecting step according to an embodiment.

Referring to FIG. 8, the moisture detection step (S720) according to an embodiment may include at least one of determining whether the steering angle sensor signal fails (S810), determining the time period of receiving the fail signal of the steering angle sensing signal (S820), determining the number of times of receiving the fail signal of the steering angle sensing signal (S830), and determining whether of the inflow of moisture (S840, S850).

In the step of determining whether the steering angle sensing signal fails (S810), if the fail signal is received more than a preset threshold number of times, there may be determined that moisture has flowed into the steering device.

In the step of determining time period of receiving the fail signal of the steering angle sensing signal (S820), if the fail signal is received for a predetermined threshold period or longer, there may be determined that moisture has flowed into the steering device.

In the step of determining the number of times of receiving the fail signal of the steering angle sensing signal (S830), if the fail signal is continuously received more than a preset threshold number of times, there may be determined that moisture has flowed into the steering device.

In the step of determining whether of the inflow of moisture (S840, S850), if all of the moisture detection conditions, including whether of fail signal, the time period of the fail signal, and the number of time of consecutive fail signals are satisfied, there may be determined as the inflow of moisture (S840), and if any of the moisture detection conditions are not satisfied, there may be determined as no inflow of moisture (S850).

In addition, in some cases, in the moisture detection step (S720), if a condition for determining whether the weather around the vehicle is rainy state based on the surrounding image information and a condition that the steering angle sensing signal is a fail signal are simultaneously satisfied, there may be determined that moisture has flowed into the steering device.

In addition, in the moisture detection step (S720), if the moisture monitoring signal received from the moisture inflow determination circuit exceeds a preset threshold range, there may be determined that moisture has flowed into the steering device.

FIG. 9 is a flowchart illustrating the risk prevention controls according to an embodiment.

Referring to FIG. 9, the risk prevention control step (S730) according to an embodiment may include a safe steering control step (S910), a detection information transmission step (S920), and a warning notification control step (S930).

In the safe steering control step (S910), there may be controlled so as for a steering torque generated by a steering motor to be maintained below a risk prevention torque.

For example, in the safe steering control step (S910), in the event of a failure in some components of the vehicle according to a Limp Home mode or a Limp Aside mode, the control value of each component of the vehicle may be reset to a preset value, so that the in-vehicle devices including steering devices may be controlled in a state where the spread of failure is prevented.

The detection information transmission step (S920) may include transmitting moisture detection information to other control devices in the vehicle. Accordingly, if moisture flows into the steering device, other devices in the vehicle may also perform an operation to prevent risk due to the inflow of moisture.

The warning notification control step (S930) may include at least one of a DTC message notification control step using the on-board diagnostic (OBD) system of the vehicle, a navigation message notification control step using the navigation device, and a warning sound and warning lamp notification control step using the audio output device, beep sound output device, or warning lamp display device installed in the vehicle.

Figure 10:
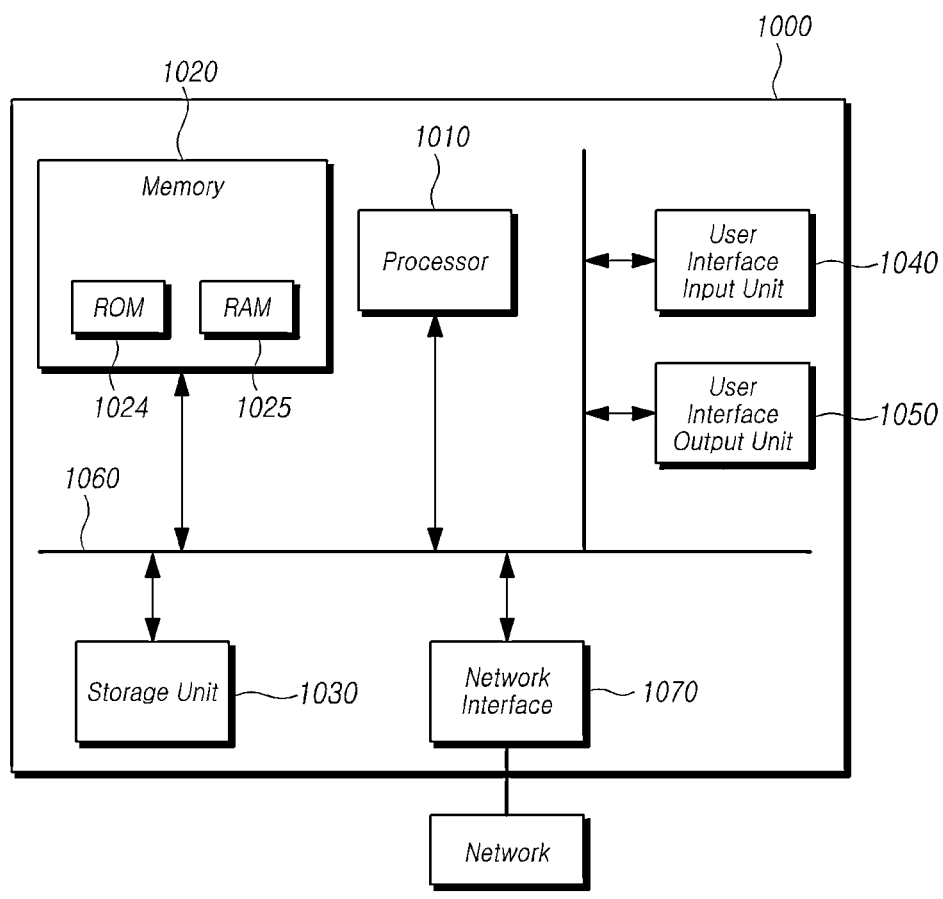
FIG. 10 is a block diagram of a computer system of a steering control device according to an embodiment.

FIG. 10 is a block diagram of a computer system of a steering control device according to an embodiment.

Referring to FIG. 10, the above-described embodiments may be implemented as a computer readable recording medium in a computer system. As shown in FIG. 10, a computer system 1000, which is an example of a steering control device according to the present embodiments, may include at least one element of one or more processors 1010, a memory 1020, a storage unit 1030, a user interface input unit 1040, and a user interface output unit 1050. These elements may communicate with each other via the bus 1060. Further, the computer system 1000 may also include a network interface 1070 for connecting to a network. The processor 1010 may be a CPU or a semiconductor device for executing processing instructions stored in the memory 1020 and/or the storage 1030. The memory 1020 and the storage unit 1030 may include various types of volatile/nonvolatile storage media. For example, the memory may include ROM 1024 and RAM 1025.

Accordingly, the present embodiments may be implemented as a computer-implemented method or a non-volatile computer recording medium for storing computer-executable instructions. The instructions may be executed by a processor to perform a method according to at least one embodiment of the present disclosure.

More specifically, the steering control device 100 according to an embodiment, and the communication unit 110, the detector 120 and the controller 130 included therein may be implemented as a control device of a steering system installed in a vehicle or as a part of an ECU module.

The control device or ECU of the steering system may include a processor and a storage device such as a memory and a computer program capable of performing a specific function. In addition, the communication unit 110, the detector 120, and controller 130 may be implemented as software modules capable of performing respective corresponding functions.

That is, the communication unit 110, the detector 120 and the controller 130 according to an embodiment of the present disclosure may be implemented as corresponding software modules and stored in a memory. In addition, each software module may be executed in an arithmetic processing unit such as an ECU included in a steering system at a specific time point.

As described above, the present disclosure may provide a control device and method capable of quickly detecting the inflow of moisture into a steering device.

In addition, the present disclosure may provide a control device and method capable of detecting the inflow of moisture into a steering angle sensor.

In addition, the present disclosure may provide a control device and method capable of preventing a failure of the power pack due to the inflow of moisture into a steering device.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering control device comprising a processor configured to:

receive a steering angle sensing signal from a steering angle sensor installed at a lower part of a rack-pinion gear;

detect whether of an inflow of moisture into a steering device using only the steering angle sensing signal and generate moisture detection information if the inflow of moisture is detected; and perform a risk prevention control to prevent risk due to the inflow of moisture based on the moisture detection information, wherein the steering angle sensor is located under the lower part where a rack bar and a pinion shaft are coupled, wherein the steering device includes a steering driving device in which an ECU, a motor, a cover assembly, a rack device, a bellows, and a tie rod are installed, and wherein the processor is configured to detect moisture entering into the steering driving device through the bellows by using only the steering angle sensing signal from the steering angle sensor installed in a ground direction at a lower part of the rack device to prevent the entered moisture from flowing into the ECU and the motor.

2. The steering control device of claim 1, wherein the detector determines that moisture has flowed into the steering device if the steering angle sensing signal is a fail signal.

3. The steering control device of claim 2, wherein the detector determines that moisture has flowed into the steering device if the fail signal is received for more than a threshold period.

4. The steering control device of claim 2, wherein the detector determines that moisture has flowed into the steering device if the fail signal is continuously or consecutively received more than a threshold number of times.

5. The steering control device of claim 1, wherein the communication device further receives surrounding image information captured around a vehicle from a camera sensor, wherein the detector is configured to determine whether a weather around the vehicle is a rainy situation based on the surrounding image information, and is configured to determines that moisture has flowed into the steering device if a condition determined to be the rainy situation based on the surrounding image information and a condition that the steering angle sensing signal is a fail signal are simultaneously satisfied.

6. The steering control device of claim 1, wherein the communication device further receives weather information around a vehicle from a V2X communication device, wherein the detector is configured to determine whether a weather around the vehicle is a rainy situation based on the weather information, and is configured to determines that moisture has flowed into the steering device if a condition determined to be the rainy situation based on the weather information and a condition that the steering angle sensing signal is a fail signal are simultaneously satisfied.

7. The steering control device of claim 1, wherein the communication device further receives a moisture monitoring signal from a moisture inflow determination circuit installed in the steering angle sensor, wherein the detector is configured to determine that moisture has flowed into the steering device if the moisture monitoring signal exceeds a threshold range.

8. The steering control device of claim 1, wherein the risk prevention control comprises a safe steering control for controlling so that a steering torque generated by a steering motor is maintained below a risk prevention torque.

9. The steering control device of claim 1, wherein the risk prevention control comprises a sensing information transmission control for transmitting the moisture detection information to other control devices in a vehicle.

10. The steering control device of claim 1, wherein the risk prevention control comprises a warning notification control including at least one of a diagnostic trouble code (DTC) message output, a navigation message output, a warning sound output, and a warning lamp display.

11. A steering control method comprising:

receiving a steering angle sensing signal from a steering angle sensor installed at a lower part of a rack-pinion gear, the steering angle sensor being located under the lower part where a rack bar and a pinion shaft are coupled;

detecting whether of an inflow of moisture into a steering device using only the steering angle sensing signal, and generating moisture detection information if the inflow of moisture is detected; and performing a risk prevention control to prevent risk due to the inflow of moisture based on the moisture detection information, wherein the steering device includes a steering driving device in which an ECU, a motor, a cover assembly, a rack device, a bellows, and a tie rod are installed, and wherein the detecting of whether of the inflow of the moisture into the steering device includes detecting moisture entering into the steering driving device through the bellows by using only the steering angle sensing signal from the steering angle sensor installed in a ground direction at a lower part of the rack device to prevent the entered moisture from flowing into the ECU and the motor.

12. The steering control method of claim 11, wherein the detecting comprises determining that moisture has flowed into the steering device if the steering angle sensing signal is a fail signal.

13. The steering control method of claim 12, wherein the detecting comprises determining that moisture has flowed into the steering device if the fail signal is received for more than a threshold period.

14. The steering control method of claim 12, wherein the detecting comprises determining that moisture has flowed into the steering device if the fail signal is continuously or consecutively received more than a threshold number of times.

15. The steering control method of claim 11, wherein the receiving comprises further receiving surrounding image information captured around a vehicle from a camera sensor, wherein the detecting comprises determining whether a weather around the vehicle is a rainy situation based on the surrounding image information, and determining that moisture has flowed into the steering device if a condition determined to be the rainy situation based on the surrounding image information and a condition that the steering angle sensing signal is a fail signal are simultaneously satisfied.

16. The steering control method of claim 11, wherein the receiving comprises further receiving weather information around a vehicle from a V2X communication device, wherein the detecting comprises determining whether a weather around the vehicle is a rainy situation based on the weather information, and determining that moisture has flowed into the steering device if a condition determined to be the rainy situation based on the weather information and a condition that the steering angle sensing signal is a fail signal are simultaneously satisfied.

17. The steering control method of claim 11, wherein the receiving comprises further receiving a moisture monitoring signal from a moisture inflow determination circuit installed in the steering angle sensor, wherein the detecting comprises determining that moisture has flowed into the steering device if the moisture monitoring signal exceeds a threshold range.

18. The steering control method of claim 11, wherein the risk prevention control comprises a safe steering control for controlling so that a steering torque generated by a steering motor is maintained below a risk prevention torque.

19. The steering control method of claim 11, wherein the risk prevention control comprises a sensing information transmission control for transmitting the moisture detection information to other control devices in a vehicle.

20. The steering control method of claim 11, wherein the risk prevention control comprises a warning notification control including at least one of a diagnostic trouble code (DTC) message output, a navigation message output, a warning sound output, and a warning lamp display.

\* \* \* \* \*